United States Patent
Liu et al.

(10) Patent No.: US 9,746,589 B2
(45) Date of Patent: Aug. 29, 2017

(54) RANGE FINDER AND PRISM ASSEMBLY THEREOF

(71) Applicants: Sintai Optical (Shenzhen) Co., Ltd., Shenzhen (CN); Asia Optical International Ltd., Tortola (GB)

(72) Inventors: Hua-Tang Liu, Taichung (TW); Ching-Shiang Wang, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 469 days.

(21) Appl. No.: 14/459,377

(22) Filed: Aug. 14, 2014

(65) Prior Publication Data
US 2015/0055116 A1    Feb. 26, 2015

(30) Foreign Application Priority Data

Aug. 22, 2013 (TW) ............... 102129946 A
Aug. 22, 2013 (TW) ............... 102129947 A

(51) Int. Cl.
*G02B 5/04* (2006.01)
*G01C 3/08* (2006.01)
*G01S 7/481* (2006.01)
*G01S 17/08* (2006.01)

(52) U.S. Cl.
CPC ............ *G02B 5/04* (2013.01); *G01C 3/08* (2013.01); *G01S 7/481* (2013.01); *G01S 17/08* (2013.01)

(58) Field of Classification Search
CPC ............ G01C 3/00; G01C 3/08; G02B 27/10
See application file for complete search history.

(56) References Cited

U.S. PATENT DOCUMENTS

| 6,292,314 B1* | 9/2001 | Perger ............ G02B 23/10 359/638 |
| 6,441,887 B1 | 8/2002 | Kao |
| 2004/0184023 A1* | 9/2004 | Kao ............ G02B 27/1066 356/4.01 |

FOREIGN PATENT DOCUMENTS

TW           200419183 A        10/2004

OTHER PUBLICATIONS

English Abstract translation of TW200419183 (Published Oct. 1, 2004).

* cited by examiner

*Primary Examiner* — Luke Ratcliffe
(74) *Attorney, Agent, or Firm* — McClure, Qualey & Rodack, LLP

(57) ABSTRACT

A prism assembly includes a first prism, a second prism, a roof prism and an optical multilayer film. The first prism includes a first, a second and a third surface. The second prism includes a fourth, a fifth and a sixth surface. The fifth surface faces the third surface. The roof prism includes a seventh, an eighth and a ridge surface. The seventh surface faces the second surface. The optical multilayer film is disposed between the fifth surface and the third surface. A first light beam and a second light beam entering the first prism are totally reflected from the second surface to the optical multilayer film which reflects the first light beam but allows the second light beam to pass through. The second light beam enters the second prism, is totally reflected on the sixth surface, and exits from the fourth surface of the second prism.

20 Claims, 7 Drawing Sheets

RANGE FINDER AND PRISM ASSEMBLY THEREOF

BACKGROUND OF THE INVENTION

Field of the Invention

The invention relates to a range finder and prism assembly thereof.

Description of the Related Art

Taiwan Patent No. TW594052 (which corresponds to U.S. Pat. No. 7,031,062) discloses a prism assembly and a range finder using the prism assembly, wherein the prism assembly includes four surfaces for light to enter/exit. By this arrangement, an infrared beam entering the prism assembly undergoes only one total internal reflection and exits the prism assembly in a direction differing from its original propagation direction. In addition, a visible light beam entering the prism assembly undergoes a reflection and four total internal reflections, and exits the prism assembly without changing its original propagation direction. Alternatively, the visible light beam entering the prism assembly undergoes three total internal reflections and exits the prism assembly in a direction differing from its original propagation direction.

BRIEF SUMMARY OF THE INVENTION

The invention provides a range finder and prism assembly thereof, wherein a second light beam entering the prism assembly undergoes two total internal reflections and exits the prism assembly in an opposite direction. The invention can simplify the design of a position of a receiver.

The invention further provides a range finder and prism assembly thereof, wherein a second light beam entering the prism assembly undergoes two total internal reflections and exits the prism assembly in an opposite direction, wherein one of the total internal reflections arises from an optical total reflection film which is coated on a prism surface. This arrangement can decrease energy loss of the second light beam caused by the total internal reflections thereby increasing the accuracy of the distance measurement of the range finder, or increase the range of the distance measurement of the range finder. Also, this arrangement can simplify the design and reduce the volume of the range finder.

The prism assembly in accordance with an exemplary embodiment of the invention includes a first prism, a second prism, a roof prism and an optical multilayer film. The first prism includes a first surface, a second surface and a third surface. The second prism includes a fourth surface, a fifth surface and a sixth surface. The fifth surface faces the third surface. The roof prism includes a seventh surface, an eighth surface and a ridge surface. The seventh surface faces the second surface. The optical multilayer film is disposed between the fifth surface and the third surface. A first light beam and a second light beam incident on the first surface of the first prism are totally reflected from the second surface to the optical multilayer film, the optical multilayer film reflects the first light beam but allows the second light beam to pass through and enter the second prism, the second light beam is incident on the fifth surface of the second prism and totally reflected by the sixth surface so that a propagation direction thereof is changed, and the second light beam exits from the fourth surface of the second prism.

In another exemplary embodiment, the third surface and the fifth surface are cemented.

In yet another exemplary embodiment, the second surface and the seventh surface are cemented.

In another exemplary embodiment, the first light beam is a visible light beam and the second light beam is an infrared beam.

The range finder in accordance with an exemplary embodiment of the invention includes a transmitter, an object lens, a prism assembly and a receiver. The second light beam is emitted by the transmitter and reflected by a measured object, passes through the object lens together with the first light beam, and enters the prism assembly. The prism assembly guides the first light beam and the second light beam in different directions so that the second light beam is incident on the receiver.

In another exemplary embodiment, the first light beam is a visible light beam and the second light beam is an infrared beam.

In yet another exemplary embodiment, the range finder further includes an optical filter which is disposed between the receiver and the prism assembly, wherein the optical filter only allows the second light beam to pass through.

In another exemplary embodiment, the range finder further includes a lens which is disposed between the transmitter and the measured object.

In yet another exemplary embodiment, the transmitter is a semiconductor laser.

In another exemplary embodiment, the receiver is an avalanche photodiode (APD) or a photo diode (PD).

In yet another exemplary embodiment, the range finder further includes a lens which is disposed between the receiver and the prism assembly.

In another exemplary embodiment, the range finder further includes an eyepiece which is disposed beside the roof prism so that the measured object can be observed through the eyepiece.

The prism assembly in accordance with an exemplary embodiment of the invention includes a first prism, a second prism, an optical total reflection film, a roof prism and an optical multilayer film. The first prism includes a first surface, a second surface and a third surface. The second prism includes a fourth surface, a fifth surface and a sixth surface. The optical total reflection film is coated on the sixth surface. The roof prism includes a seventh surface, an eighth surface and a ridge surface. The seventh surface faces the second surface. The fifth surface faces the third surface. The optical multilayer film is disposed between the fifth surface and the third surface. A first light beam and a second light beam incident on the first surface of the first prism are totally reflected from the second surface to the optical multilayer film, the optical multilayer film reflects the first light beam but allows the second light beam to pass through and enter the second prism, the second light beam is incident on the fifth surface of the second prism and totally reflected by the optical total reflection film so that a propagation direction thereof is changed, and the second light beam exits from the fourth surface of the second prism.

In another exemplary embodiment, an angle between the fourth surface and the fifth surface is approximately 67.5 degrees, an angle between the fourth surface and the sixth surface is approximately 45 degrees, and an angle between the fifth surface and the sixth surface is approximately 67.5 degrees.

In yet another exemplary embodiment, the third surface and the fifth surface are cemented.

In another exemplary embodiment, the second surface and the seventh surface are cemented.

In yet another exemplary embodiment, the first light beam is a visible light beam and the second light beam is an infrared beam.

The range finder in accordance with an exemplary embodiment of the invention includes a transmitter, an object lens, a prism assembly and a receiver. The second light beam is emitted by the transmitter and reflected by a measured object, passes through the object lens together with the first light beam, and enters the prism assembly. The prism assembly guides the first light beam and the second light beam in different directions so that the second light beam is incident on the receiver.

In another exemplary embodiment, the first light beam is a visible light beam and the second light beam is an infrared beam.

In yet another exemplary embodiment, the range finder further includes a lens which is disposed between the transmitter and the measured object.

In another exemplary embodiment, the transmitter is a semiconductor laser.

In yet another exemplary embodiment, the receiver is an avalanche photodiode (APD) or a photo diode (PD).

In another exemplary embodiment, the range finder further includes a lens which is disposed between the receiver and the prism assembly.

In yet another exemplary embodiment, the range finder further includes an eyepiece which is disposed beside the roof prism so that the measured object can be observed through the eyepiece.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
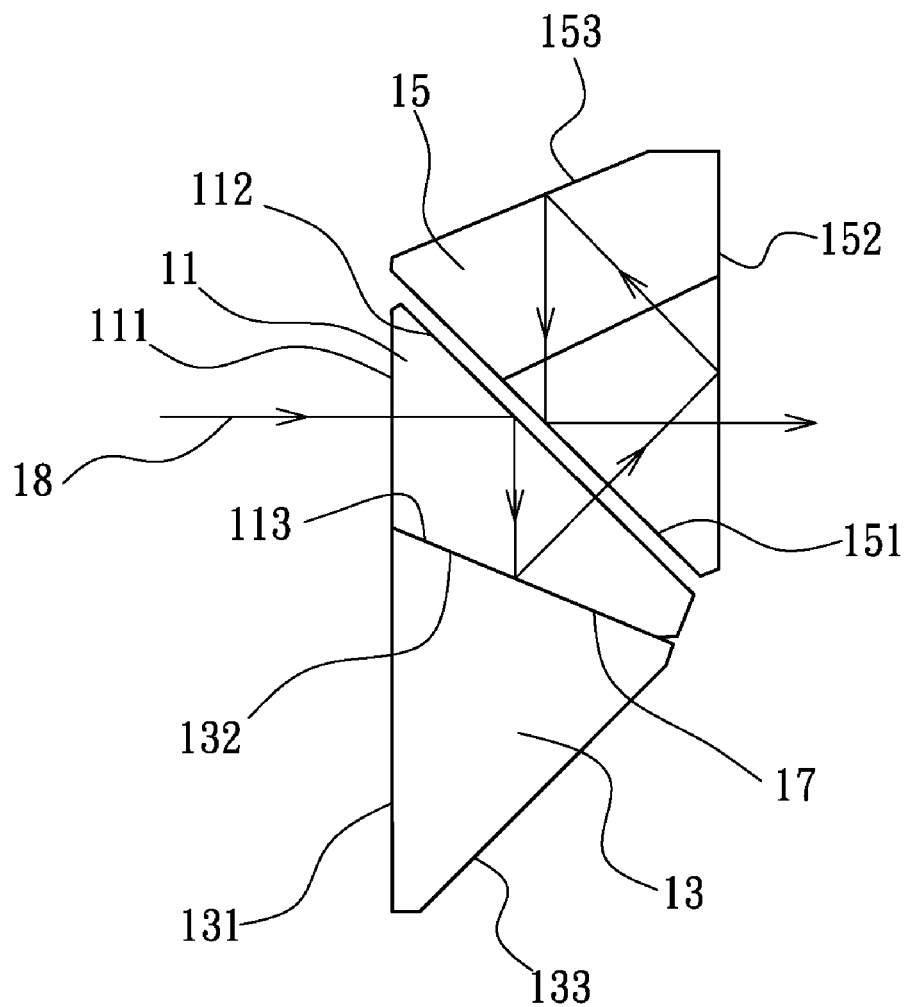
FIG. 1A is an optical path diagram of a visible light beam of a prism assembly in accordance with a first embodiment of the invention.
Figure 1B:
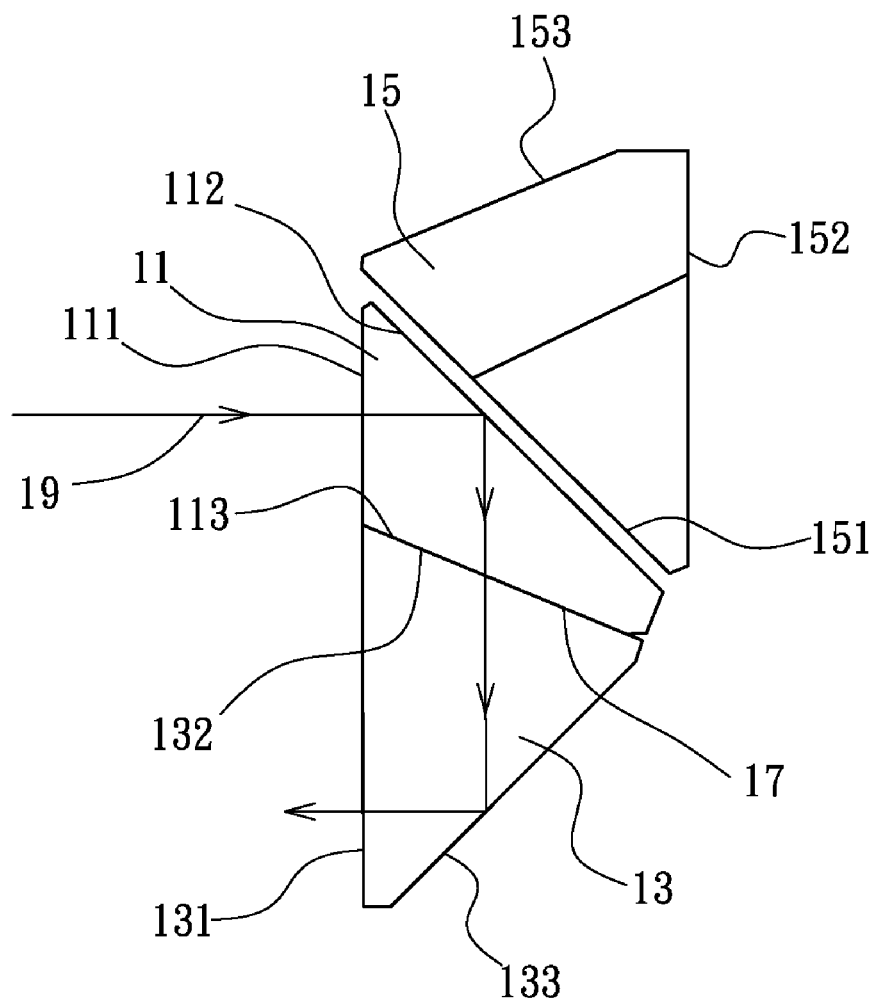
FIG. 1B is an optical path diagram of an infrared beam of the prism assembly in accordance with the first embodiment of the invention.

Referring to FIG. 1A and FIG. 1B, FIG. 1A is an optical path diagram of a visible light beam of a prism assembly in accordance with a first embodiment of the invention, and FIG. 1B is an optical path diagram of an infrared beam of the prism assembly in accordance with the first embodiment of the invention. As shown in FIG. 1A, the prism assembly 10 includes a first prism 11, a second prism 13, a roof prism 15 and an optical multilayer film 17. The optical multilayer film 17 is sandwiched between the first prism 11 and the second prism 13, and allows infrared to pass through but reflects visible light. A third surface 113 of the first prism 11 and a fifth surface 132 of the second prism 13 are cemented. A second surface 112 of the first prism 11 faces a seventh surface 151 of the roof prism 15.

When reaching the first prism 11, a visible light beam 18 passes through the first surface 111, is incident on the second surface 112, and undergoes a total internal reflection on the second surface 112. Then, the propagation direction of the visible light beam 18 is changed, and the visible light beam 18 is incident on the third surface 113 and the optical multilayer film 17. The optical multilayer film 17 allows infrared to pass through but reflects visible light so that the visible light beam 18 is reflected, with its propagation direction changed, to the second surface 112, exits from the second surface 112 of the first prism 11, and is directed to the roof prism 15. When reaching the roof prism 15, the visible light beam 18 directly passes through the seventh surface 151, undergoes total internal reflections on the eighth surface 152, the ridge surface 153 and the seventh surface 151 with its propagation directions changed, and exits from the eighth surface 152 of the roof prism 15.

Referring to FIG. 1B, when reaching the first prism 11, an infrared beam 19 passes through the first surface 111, is incident on the second surface 112, undergoes a total internal reflection on the second surface 112 with its propagation direction changed, and is incident on the third surface 113 and the optical multilayer film 17. The optical multilayer film 17 allows infrared to pass through but reflects visible light so that the infrared beam 19 directly passes through the third surface 113 and the optical multilayer film 17 and enters the second prism 13. The infrared beam 19 entering the second prism 13 directly passes through the fifth surface 132, is incident on the sixth surface 133, undergoes a total internal reflection on the sixth surface 133 with its propagation direction changed, and exits from the fourth surface 131 of the second prism 13.

As described above, the visible light beam 18 and the infrared beam 19 will be separated and propagate in different directions if the visible light beam 18 and the infrared beam 19 are simultaneously incident on the first surface 111 of the prism assembly 10. The visible light beam 18 exits from the eighth surface 152 of the prism assembly 10 without changing its propagation direction. The infrared beam 19 exits from the fourth surface 131 of the prism assembly 10 with its propagation direction changed to an opposite direction. The above operation can be changed. For example, the infrared beam 19 is incident on the fourth surface 131 of the prism assembly 10, exits from the first surface 111 of the prism assembly 10 with its propagation direction changed to an opposite direction, while the visible light beam 18 is still incident on the first surface 111 of the prism assembly 10, exits from the eighth surface 152 of the prism assembly 10 without changing its propagation direction. For another example, the visible light beam and the infrared beam which propagate in different directions can be combined to propagate in the same direction. Specifically, the visible light beam 18 is incident on the eighth surface 152 of the prism assembly 10, and exits from the first surface 111 of the prism assembly 10 without changing its propagation direction. Also, the infrared beam 19 is incident on the fourth surface 131 of the prism assembly 10, and exits from the first surface 111 of the prism assembly 10 with its propagation direction changed to an opposite direction. As a result, the visible light beam 18 and the infrared beam 19 propagate in the same direction.

Figure 2:
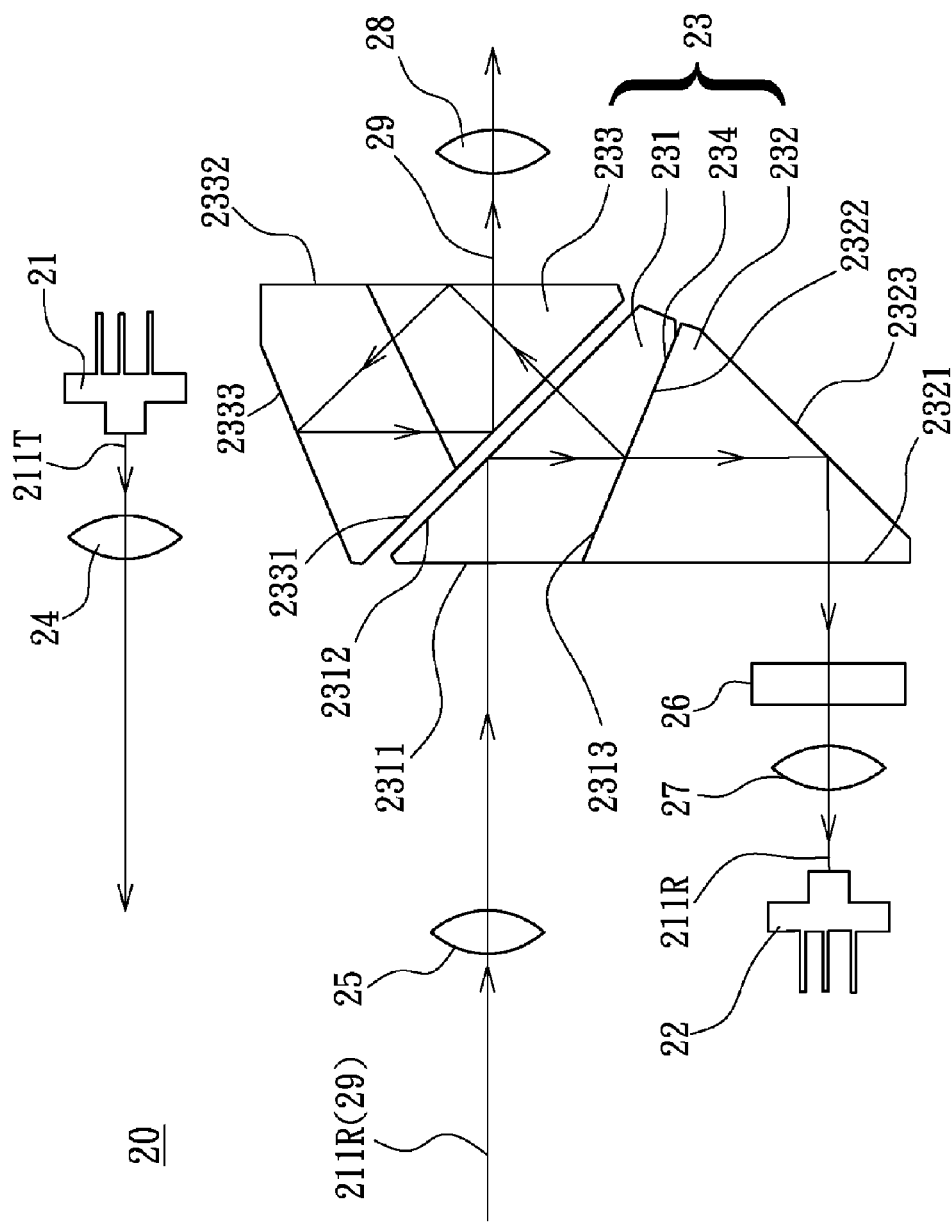
FIG. 2 depicts the structure and optical paths of a range finder in accordance with a first embodiment of the invention.

Referring to FIG. 2, FIG. 2 depicts the structure and optical paths of a range finder in accordance with a first embodiment of the invention. The range finder 20 includes a transmitter 21, a receiver 22, a prism assembly 23, a lens 24, an object lens 25, an optical filter 26, a lens 27 and an eyepiece 28. The prism assembly 23 includes a first prism 231, a second prism 232, a roof prism 233 and an optical multilayer film 234. The optical multilayer film 234 is sandwiched between the first prism 231 and the second prism 232. A third surface 2313 of the first prism 231 and a fifth surface 2322 of the second prism 232 are cemented. A second surface 2312 of the first prism 231 faces a seventh surface 2331 of the roof prism 233. The lens 24 is disposed between the transmitter 21 and a measured object (not shown). The optical filter 26 is disposed between the receiver 22 and the fourth surface 2321. The lens 27 is disposed between the receiver 22 and the optical filter 26. The eyepiece 28 is disposed beside the eighth surface 2332.

An infrared beam 211T emitted by the transmitter 21 passes through the lens 24 to become collimated and reaches the measured object. The measured object reflects the infrared beam 211T in which an infrared beam 211R is directed to the range finder 20. The measured object can also reflect visible light. Therefore, a visible light beam 29 is directed to the range finder 20. The infrared beam 211R and the visible light beam 29 which are directed to the range finder 20 pass through the object lens 25 and are incident on the first surface 2311 of the prism assembly 23. The prism assembly 23 can separate the infrared beam 211R and the visible light beam 29. The infrared beam 211R separated by the prism assembly 23 exits from the fourth surface 2321 and passes through the optical filter 26. The optical filter 26 allows the infrared beam 211R to pass through and filters out other light. The infrared beam 211R is focused on the receiver 22 by the lens 27 and processed to obtain a distance of the measured object. The visible light beam 29 separated by the prism assembly 23 exits from the eighth surface 2332 of the prism assembly 23 and passes through the eyepiece 28. The user can watch image of the measured object through the eyepiece 28.

In the first embodiment, the transmitter 21 is a semiconductor laser, and the receiver 22 is an avalanche photodiode (APD) or a photo diode (PD).

In the first embodiment, the infrared beam 211R and the visible light beam 29 are separated by the prism assembly 23, and respectively incident on the receiver 22 and eyepiece 28. However, it has the same effect and falls into the scope of the invention that the relative positions between the prism assembly 23, the transmitter 21, the receiver 22, the optical filter 26, the lens 24 and the lens 27 are changed so that the infrared beam 211T emitted by the transmitter 21 is incident on the fourth surface 2321 of the prism assembly 23, exits from the first surface 2311 of the prism assembly 23, passes through the object lens 25, and is directed to the measured object, and the infrared beam 211R reflected from the measured object to the range finder 20 passes through the optical filter 26 and the lens 27 and is received by the receiver 22.

Figure 3A:
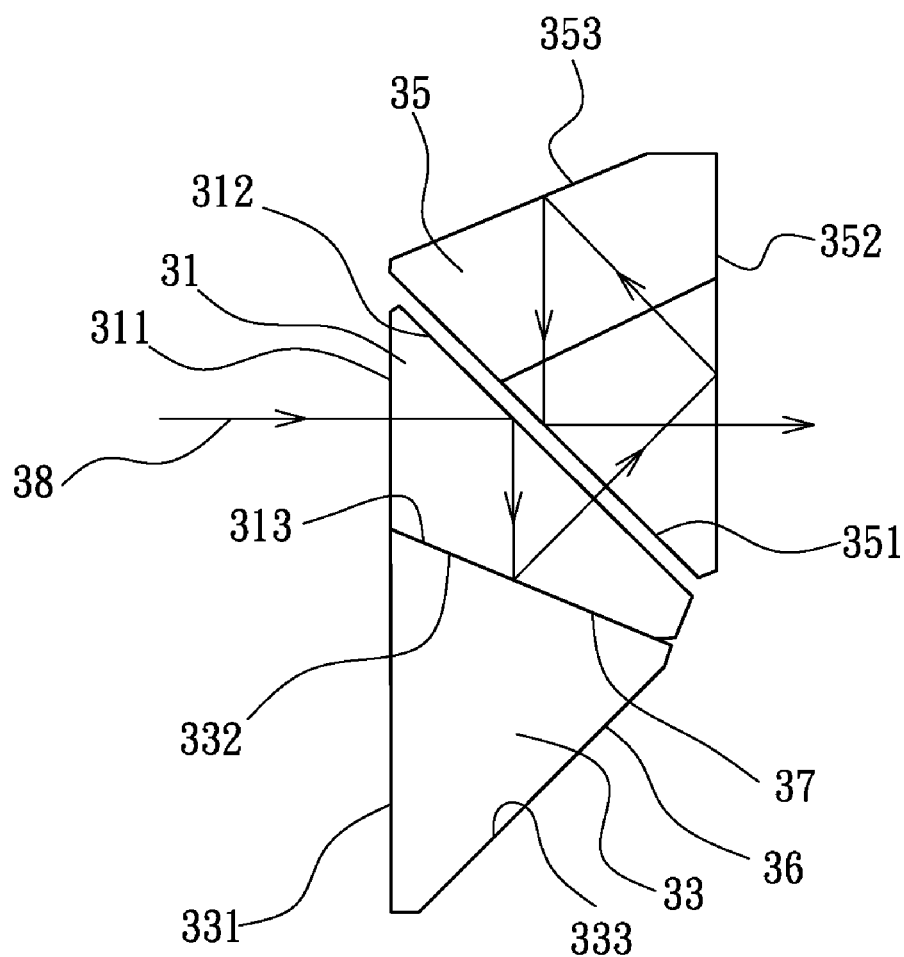
FIG. 3A is an optical path diagram of a visible light beam of a prism assembly in accordance with a second embodiment of the invention.
Figure 3B:
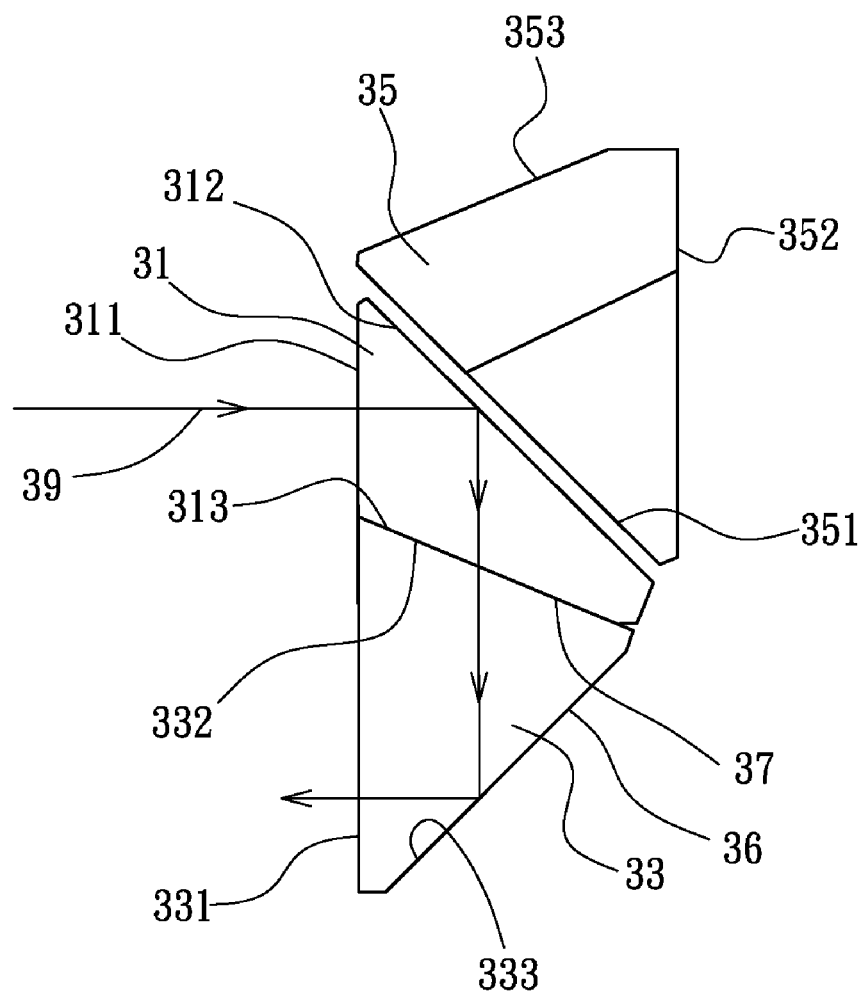
FIG. 3B is an optical path diagram of an infrared beam of the prism assembly in accordance with the second embodiment of the invention.
Figure 3C:
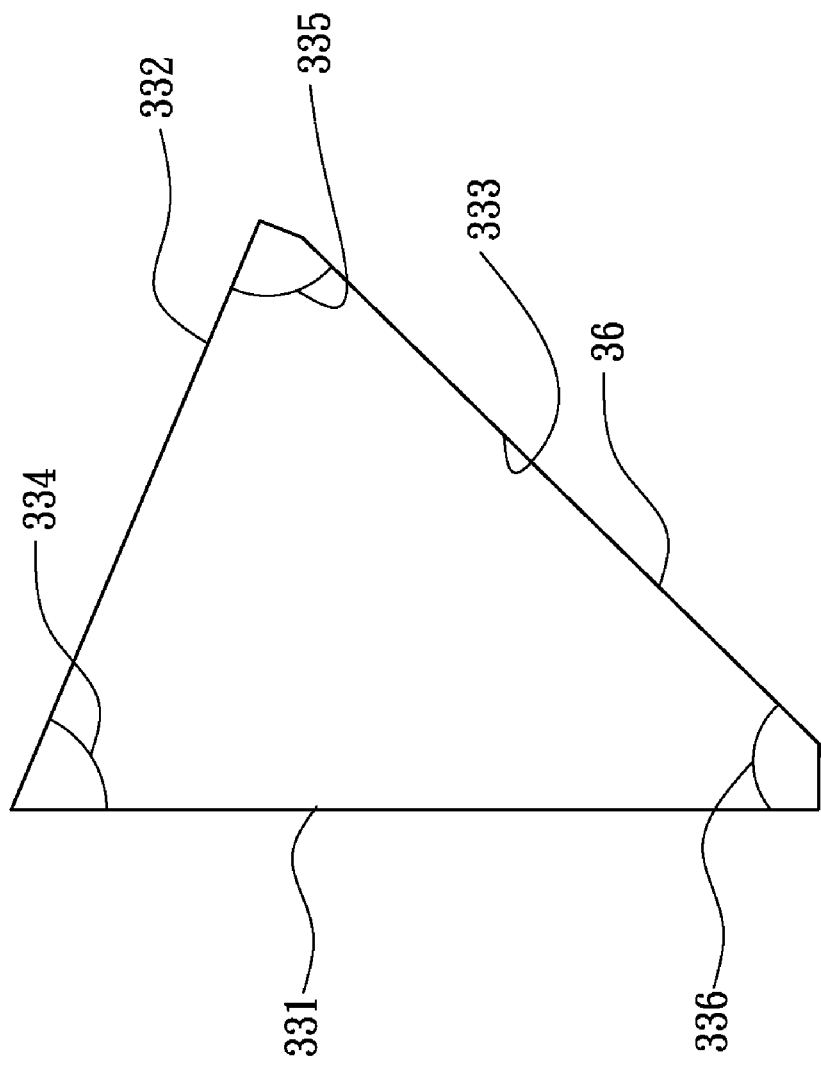
FIG. 3C shows each angle between the adjacent surfaces of the second prism of FIG. 3A.

Referring to FIG. 3A, FIG. 3B and FIG. 3C, FIG. 3A is an optical path diagram of a visible light beam of a prism assembly in accordance with a second embodiment of the invention, FIG. 3B is an optical path diagram of an infrared beam of the prism assembly in accordance with the second embodiment of the invention and FIG. 3C shows each angle between the adjacent surfaces of the second prism of FIG. 3A. As shown in FIG. 3A, the prism assembly 30 includes a first prism 31, a second prism 33, a roof prism 35 and an optical multilayer film 37. The optical multilayer film 37 is sandwiched between the first prism 31 and the second prism 33, and allows infrared to pass through but reflects visible light. A third surface 313 of the first prism 31 and a fifth surface 332 of the second prism 33 are cemented. A second surface 312 of the first prism 31 faces a seventh surface 351 of the roof prism 35. An optical total reflection film 36 is coated on the sixth surface 333 of the second prism 33. The incident infrared can be totally reflected by the optical total reflection film 36. As shown in FIG. 3C, an angle 334 between the fourth surface 331 and the fifth surface 332 of the second prism 33 is equal to 67.5 degrees, an angle 336 between the fourth surface 331 and the sixth surface 333 of the second prism 33 is equal to 45 degrees and an angle 335 between the fifth surface 332 and the sixth surface 333 of the second prism 33 is equal to 67.5 degrees.

When reaching the first prism 31, a visible light beam 38 passes through the first surface 311, is incident on the second surface 312, and undergoes a total internal reflection on the second surface 312. Then, the propagation direction of the visible light beam 38 is changed, and the visible light beam 38 is incident on the third surface 313 and the optical multilayer film 37. The optical multilayer film 37 allows infrared to pass through but reflects visible light so that the visible light beam 38 is reflected, with its propagation direction changed, to the second surface 312, exits from the second surface 312 of the first prism 31, and is directed to the roof prism 35. When reaching the roof prism 35, the visible light beam 38 directly passes through the seventh surface 351, undergoes total internal reflections on the eighth surface 352, the ridge surface 353 and the seventh surface 351 with its propagation directions changed, and exits from the eighth surface 352 of the roof prism 15.

Referring to FIG. 3B, when reaching the first prism 31, an infrared beam 39 passes through the first surface 311, is incident on the second surface 312, undergoes a total internal reflection on the second surface 312 with its propagation direction changed, and is incident on the third surface 313 and the optical multilayer film 37. The optical multilayer film 37 allows infrared to pass through but reflects visible light so that the infrared beam 39 directly passes through the third surface 313 and the optical multilayer film 37 and enters the second prism 33. The infrared beam 39 entering the second prism 33 directly passes through the fifth surface 332, is incident on the sixth surface 333, undergoes a total internal reflection on the optical total reflection film 36 with its propagation direction changed, and exits from the fourth surface 331 of the second prism 33.

As described above, the visible light beam 38 and the infrared beam 39 will be separated and propagate in different directions if the visible light beam 38 and the infrared beam 39 are simultaneously incident on the first surface 311 of the prism assembly 30. The visible light beam 38 exits from the eighth surface 352 of the prism assembly 30 without changing its propagation direction. The infrared beam 39 exits from the fourth surface 331 of the prism assembly 30 with its propagation direction changed to an opposite direction. The above operation can be changed. For example, the infrared beam 39 is incident on the fourth surface 331 of the prism assembly 30, exits from the first surface 311 of the prism assembly 30 with its propagation direction changed to an opposite direction, while the visible light beam 38 is still incident on the first surface 311 of the prism assembly 30, exits from the eighth surface 352 of the prism assembly 30 without changing its propagation direction. For another example, the visible light beam and the infrared beam which propagate in different directions can be combined to propagate in the same direction. Specifically, the visible light beam 38 is incident on the eighth surface 352 of the prism assembly 30, and exits from the first surface 311 of the prism assembly 30 without changing its propagation direction. Also, the infrared beam 39 is incident on the fourth surface 331 of the prism assembly 30, and exits from the first surface 311 of the prism assembly 30 with its propagation direction changed to an opposite direction. As a result, the visible light beam 38 and the infrared beam 39 propagate in the same direction.

Figure 4:
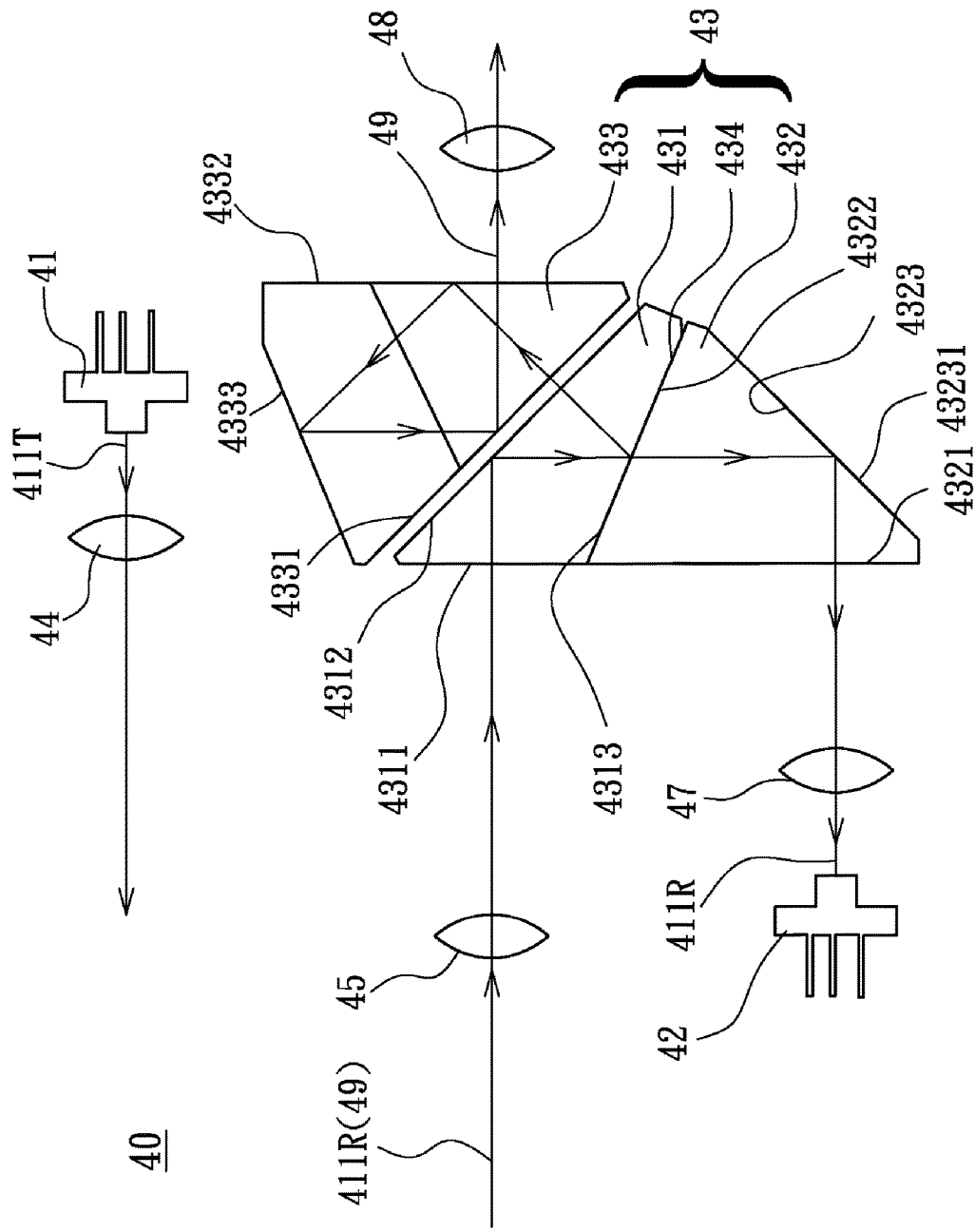
FIG. 4 depicts the structure and optical paths of a range finder in accordance with a second embodiment of the invention.

Referring to FIG. 4, FIG. 4 depicts the structure and optical paths of a range finder in accordance with a second embodiment of the invention. The range finder 40 includes a transmitter 41, a receiver 42, a prism assembly 43, a lens 44, an object lens 45, a lens 47 and an eyepiece 48. The prism assembly 43 includes a first prism 431, a second prism 432, a roof prism 433 and an optical multilayer film 434. The optical multilayer film 434 is sandwiched between the first prism 431 and the second prism 432. A third surface 4313 of the first prism 431 and a fifth surface 4322 of the second prism 432 are cemented. A second surface 4312 of the first prism 431 faces a seventh surface 4331 of the roof prism 433. An optical total reflection film 43231 is coated on the sixth surface 4323 of the second prism 432. The lens 44 is disposed between the transmitter 41 and a measured object (not shown). The lens 47 is disposed between the receiver 42 and the fourth surface 4321. The eyepiece 48 is disposed on the side of the eighth surface 4332.

An infrared beam 411T emitted by the transmitter 41 passes through the lens 44 to become collimated and reaches the measured object. The measured object reflects the infrared beam 411T in which an infrared beam 411R is directed to the range finder 40. The measured object can also reflect visible light. Therefore, a visible light beam 49 is directed to the range finder 40. The infrared beam 411R and the visible light beam 49 which are directed to the range finder 40 pass through the object lens 45 and enter the prism assembly 43 through the first surface 4311. The infrared beam 411R is totally reflected by the second surface 4312, passes through the third surface 4313, the optical multilayer film 434, and the fifth surface 4322, is totally reflected by the optical total reflection film 43231, exits from the fourth surface 4321 of the prism assembly 43, passes through the lens 47, focused on the receiver 42, and processed to obtain a distance of the measured object. The visible light beam 49 is totally reflected by the second surface 4312, is reflected by the optical multilayer film 434, exits from the second surface 4312 of the first prism 431, is directed to the roof prism 433, passes through the seventh surface 4331, undergoes total internal reflections on the eighth surface 4332, the ridge surface 4333 and the seventh surface 4331 with its propagation direction changed, exits from the eighth surface 4332 of the roof prism 433, and passes through the eyepiece 48. The user can watch images of the measured object through the eyepiece 48.

In the second embodiment, the infrared beam 411R is totally reflected by the optical total reflection film 43231 rather than by the sixth surface 4323. Therefore, the infrared beam 411R which undergoes total internal reflections and is received by the receiver 42 has less energy loss. Also, the accuracy of the distance measurement of the range finder 40 is improved.

In the second embodiment, the transmitter 41 is a semiconductor laser, and the receiver 42 is an avalanche photodiode (APD) or a photo diode (PD).

In the second embodiment, the infrared beam 411R and the visible light beam 49 are separated by the prism assembly 43, and respectively incident on the receiver 42 and eyepiece 48. However, it has the same effect and falls into the scope of the invention that the relative positions between the prism assembly 43, the transmitter 41, the receiver 42, the lens 44 and the lens 47 are changed so that the infrared beam 411T emitted by the transmitter 41 is incident on the fourth surface 4321 of the prism assembly 43, is totally reflected by the optical total reflection film 43231, exits from the first surface 4311 of the prism assembly 43, passes through the object lens 45, and is directed to the measured object, and the infrared beam 411R reflected from the measured object to the range finder 40 passes through the lens 47 and is received by the receiver 42. By this arrangement, the infrared beam 411T emitted by the transmitter 41 is totally reflected by the optical total reflection film 43231 rather than by the sixth surface 4323. Therefore, the infrared beam 411T which undergoes total internal reflections and reaches the measured object has less the energy loss, and the range of the distance measurement of the range finder 40 is increased.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A prism assembly comprising:
    a first prism which comprises a first surface, a second surface and a third surface;
    a second prism which comprises a fourth surface, a fifth surface and a sixth surface, wherein the fifth surface faces the third surface;
    a roof prism which comprises a seventh surface, an eighth surface and a ridge surface, wherein the seventh surface faces the second surface; and
    an optical multilayer film which is disposed between the fifth surface and the third surface;
    wherein a first light beam and a second light beam incident on the first surface of the first prism are totally reflected from the second surface to the optical multilayer film, the optical multilayer film reflects the first light beam but allows the second light beam to pass through and enter the second prism, the second light beam is incident on the fifth surface of the second prism and totally reflected by the sixth surface so that a propagation direction thereof is changed, and the second light beam exits from the fourth surface of the second prism.

2. The prism assembly as claimed in claim 1, wherein the third surface and the fifth surface are cemented, and the second surface and the seventh surface are cemented.

3. The prism assembly as claimed in claim 1, wherein the first light beam is a visible light beam and the second light beam is an infrared beam.

4. A range finder comprising a transmitter, an object lens, the prism assembly as claimed in claim 1 and a receiver, wherein the second light beam is emitted by the transmitter and reflected by a measured object, passes through the object lens together with the first light beam, and enters the prism assembly, and the prism assembly guides the first light beam and the second light beam in different directions so that the second light beam is incident on the receiver.

5. The range finder as claimed in claim 4, wherein the first light beam is a visible light beam and the second light beam is an infrared beam.

6. The range finder as claimed in claim 4 further comprising an optical filter which is disposed between the receiver and the prism assembly, wherein the optical filter only allows the second light beam to pass through.

7. The range finder as claimed in claim 4 further comprising a lens which is disposed between the transmitter and the measured object.

8. The range finder as claimed in claim 4, wherein the transmitter is a semiconductor laser, and the receiver is an avalanche photodiode (APD) or a photo diode (PD).

9. The range finder as claimed in claim 4 further comprising a lens which is disposed between the receiver and the prism assembly.

10. The range finder as claimed in claim 4 further comprising an eyepiece which is disposed beside the roof prism so that the measured object can be observed through the eyepiece.

11. A prism assembly comprising:
a first prism which comprises a first surface, a second surface and a third surface;
a second prism which comprises a fourth surface, a fifth surface and a sixth surface, wherein the fifth surface faces the third surface;
an optical total reflection film coated on the sixth surface;
a roof prism which comprises a seventh surface, an eighth surface and a ridge surface, wherein the seventh surface faces the second surface; and
an optical multilayer film which is disposed between the fifth surface and the third surface;
wherein a first light beam and a second light beam incident on the first surface of the first prism are totally reflected from the second surface to the optical multilayer film, the optical multilayer film reflects the first light beam but allows the second light beam to pass through and enter the second prism, the second light beam is incident on the fifth surface of the second prism and totally reflected by the optical total reflection film so that a propagation direction thereof is changed, and the second light beam exits from the fourth surface of the second prism.

12. The prism assembly as claimed in claim 11, wherein an angle between the fourth surface and the fifth surface is 67.5 degrees, an angle between the fourth surface and the sixth surface is 45 degrees, and an angle between the fifth surface and the sixth surface is 67.5 degrees.

13. The prism assembly as claimed in claim 11, wherein the third surface and the fifth surface are cemented and the second surface and the seventh surface are cemented.

14. The prism assembly as claimed in claim 11, wherein the first light beam is a visible light beam and the second light beam is an infrared beam.

15. A range finder comprising a transmitter, an object lens, the prism assembly as claimed in claim 13 and a receiver, wherein the second light beam is emitted by the transmitter and reflected by a measured object, passes through the object lens together with the first light beam, and enters the prism assembly, and the prism assembly guides the first light beam and the second light beam in different directions so that the second light beam is incident on the receiver.

16. The range finder as claimed in claim 15, wherein the first light beam is a visible light beam and the second light beam is an infrared beam.

17. The range finder as claimed in claim 15 further comprising a lens which is disposed between the transmitter and the measured object.

18. The range finder as claimed in claim 15, wherein the transmitter is a semiconductor laser and the receiver is an avalanche photodiode (APD) or a photo diode (PD).

19. The range finder as claimed in claim 15 further comprising a lens which is disposed between the receiver and the prism assembly.

20. The range finder as claimed in claim 15 further comprising an eyepiece which is disposed beside the roof prism so that the measured object can be observed through the eyepiece.

* * * * *